Nov. 25, 1947.    G. W. LAMBERT    2,431,334

ELECTRICAL CONTACT ELEMENT AND THE METHOD OF MAKING SAME

Filed May 7, 1945

*INVENTOR.*
GEORGE W. LAMBERT
BY
*ATTORNEY*

Patented Nov. 25, 1947

2,431,334

UNITED STATES PATENT OFFICE 2,431,334

ELECTRICAL CONTACT ELEMENT AND THE METHOD OF MAKING SAME

George W. Lambert, Union, N. J., assignor to Federal Telephone and Radio Corporation, New York, N. Y., a corporation of Delaware Application May 7, 1945, Serial No. 592,405

7 Claims. (Cl. 219—4)

The invention relates to electrical contact elements, particularly to spot welding electrodes and to the method of making such elements.

In vacuum tubes wherein welded parts are subject to excessive temperature it is essential that metals having low vaporization, such as copper, be not employed. Normally tungsten and molybdenum are used for this purpose. Yet it has been found that tungsten electrodes have the disadvantage that they tend to stick to the material being welded. The same disadvantage has been recognized where electrical circuit spot or point contacts are used as in relays and ignition points.

It is, therefore, the main object of the present invention to provide an electrical contact element which avoids the tendency of sticking of the element to the contact part.

It is another object of the present invention to provide an electrode for spot welding which avoids the tendency of sticking of the element to the contact part.

It is still another object of the present invention to provide a method of making an electrical contact element which avoids the tendency of sticking of the element to the contacting part.

It is a further object of the present invention to provide a method of making an electrode for spot welding which avoids the sticking of the element to the contacting part.

With these and other objects in view, the present invention will become apparent and will be clearly understood in connection with the accompanying drawing, in which.

Figure 1:
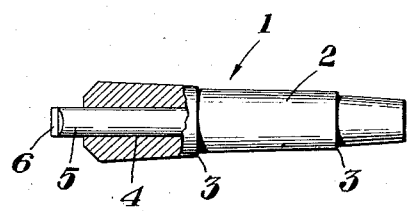
Figure 1 shows an elevational view of an electrode partly in section.
Figure 2:
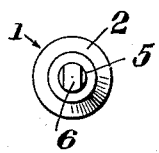
Fig. 2 is a side view of the electrode shown in Fig. 1.
Figure 3:
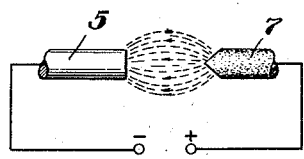
Fig. 3 is a circuit diagram illustrating a preferred method of forming a tungsten carbide layer on the end of a tungsten rod, according to my invention.

The electrical contact element according to the present invention will be described now in its application for a spot welding electrode, though the same principle can be applied for relays, ignition points or other electrical circuits where spot or point contact is used.

The electrode 1, according to the present invention, comprises a conically shaped holder 2 preferably made of copper which may be equipped with one or two collars 3 which are adapted to fit the holder into the welding machine (not shown). The holder 2 is equipped with a boring 4 to receive a rod 5 preferably made of tungsten. The tip of the rod 5 has a coating or layer 6 of tungsten carbide.

Figure 4:
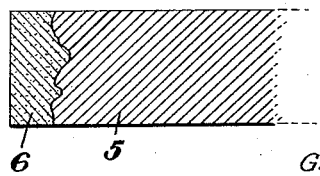
Fig. 4 shows in enlarged scale a tungsten rod using tungsten carbide coating on its tip.

As shown in Fig. 4, the tungsten carbide coating 6 at the tip of the tungsten rod 5 is easily formed by an arcing process, in a hydrogen atmosphere, in which the tungsten rod 5 is one of the electrodes whereas a carbon rod 7 forms the other electrode. When a source of power is applied between these electrodes and an arc is formed, carbon is transferred from the carbon electrode to the tungsten electrode and at the high temperatures present, the surface of the tungsten electrode will be converted into a layer of tungsten carbide on the tip of the tungsten rod 5, as shown in Fig. 4. As a result of this process the tungsten carbide will be integrally connected with the tungsten, forming a part of the tungsten rod which proves to be a better connection than that which could be achieved by any other coating means. It has been found that a layer of .020" of tungsten carbide penetrating into the tungsten rod is preferred in order to assure that the electrode does not stick to the welding parts and at the same time to avoid a high electrical resistance due to the tungsten carbide. The arcing process can be performed preferably with a voltage of 110 v. D. C., which allows of finishing the tungsten carbide layer within 30 seconds to 60 seconds.

Tests have proven that the electrode formed in accordance with the present invention will not stick to the material to be welded and, therefore, results in a clean and fast welding. Parts can be welded without substantially depositing any material and due to the rapid welding which takes place the amount of oxidation is tremendously reduced. Finally on account of the carbide tipped electrode the latter does not chip as readily as does a tungsten electrode. The tip of this electrode has also greater compressive strength. Additionally, as contrasted to an electrode formed wholly of tungsten carbide, the electrical resistance is much less. A tungsten contact, tipped with tungsten carbide in accordance with the present invention, possesses the same advantages, as the welding electrode, given as the preferred embodiment of the invention.

While I have disclosed the principles of my invention in connection with several embodiments, it will be understood that these embodiments are given by way of example only, and not as limiting the scope of the invention as set forth in the objects and the appended claims.

What I claim is:

1. An electrical contact element comprising a rod of tungsten and a layer of tungsten carbide on the tip of said rod.

2. An electrical contact element comprising a tungsten rod tipped with an integral layer of tungsten carbide.

3. An electrical contact element comprising a tungsten rod tipped with an integral layer of tungsten carbide of about .020 inch.

4. In a spot welding electrode, a holder having an axial boring, a rod of tungsten inserted into said boring, and a layer of tungsten carbide on the tip of said rod.

5. In the method of making an electrical contact element comprising a rod of tungsten and a tungsten carbide layer on the tip of the rod, including the step of providing a tungsten carbide layer at the tip of said rod of tungsten by an arcing process in a hydrogen atmosphere, in which said tungsten rod is one electrode and a carbon rod the other electrode.

6. In the method of making an electrical contact element comprising a rod of tungsten and a tungsten carbide layer on the tip of the rod, including the step of providing a tungsten carbide layer at the tip of said rod of tungsten by an arcing process in a hydrogen atmosphere at a voltage of about 110 volts D. C. and for about 30 to 60 seconds, in which said tungsten rod is one electrode and a carbon rod the other electrode.

7. An electrical contact element comprising a rod of tungsten, the tip of said rod having a layer processed with carbon to produce a layer of tungsten carbide.

GEORGE W. LAMBERT.

REFERENCES CITED

The following references are of record in the file of this patent:

UNITED STATES PATENTS

| Number    | Name    | Date          |
|-----------|---------|---------------|
| 1,019,463 | Hansen  | Mar. 5, 1912  |
| 1,176,614 | Stanley | Mar. 21, 1916 |
| 1,848,437 | Sieger  | Mar. 8, 1932  |
| 2,189,387 | Wissler | Feb. 6, 1940  |